US011536332B2

(12) United States Patent
Koike et al.

(10) Patent No.: US 11,536,332 B2
(45) Date of Patent: Dec. 27, 2022

(54) TORQUE GENERATION APPARATUS

(71) Applicant: Alps Alpine Co., Ltd., Tokyo (JP)

(72) Inventors: Asuka Koike, Miyagi-ken (JP); Misuzu Takahashi, Miyagi-ken (JP); Kazunari Takahashi, Miyagi-ken (JP); Tatsuhiro Tomiyama, Miyagi-ken (JP)

(73) Assignee: Alps Alpine Co., Ltd.

( * ) Notice: Subject to any disclaimer, the term of this patent is extended or adjusted under 35 U.S.C. 154(b) by 4 days.

(21) Appl. No.: 17/086,534

(22) Filed: Nov. 2, 2020

(65) Prior Publication Data

US 2021/0079966 A1 Mar. 18, 2021

Related U.S. Application Data

(63) Continuation of application No. PCT/JP2019/011815, filed on Mar. 20, 2019.

(30) Foreign Application Priority Data

May 18, 2018 (JP) ............................ JP2018-096109

(51) Int. Cl.

*F16D 57/00* (2006.01)
*F16D 57/02* (2006.01)
*F16D 37/02* (2006.01)

(52) U.S. Cl.

CPC ............ *F16D 57/002* (2013.01); *F16D 37/02* (2013.01)

(58) Field of Classification Search

CPC ............................... F16D 57/002; F16D 37/02
See application file for complete search history.

(56) References Cited

U.S. PATENT DOCUMENTS 4,350,913 A * 9/1982 Eddens ................. F16D 57/002 192/21.5
2007/0181391 A1* 8/2007 St. Clair ............... F16D 57/002 188/267
2011/0128135 A1 6/2011 Periquet et al.
2015/0136548 A1 5/2015 Shimura et al.
2016/0378131 A1* 12/2016 Battlogg ............. F16H 59/0217 74/553

FOREIGN PATENT DOCUMENTS

JP 2002-039246 A 2/2002
JP 2011-247403 A 12/2011

(Continued)

*Primary Examiner* — Melody M Burch

(74) *Attorney, Agent, or Firm* — Harness, Dickey & Pierce, P.L.C.

(57) ABSTRACT

A torque generation apparatus includes a magnetic disc rotatable about a rotation axis, a first yoke, a second yoke, a magnetic viscous fluid placed between the magnetic disc and the first yoke and the second yoke, a coil, and a third yoke. The coil overlaps with the magnetic disc as viewed along the rotation axis. The third yoke constitutes a magnetic path of a magnetic field generated by the coil together with the first yoke and the second yoke. The magnetic disc includes a torque increasing portion at at least one of a surface facing the first yoke and a surface facing the second yoke. The torque increasing portion is provided in an outer circumferential area of the magnetic disc in a radial direction and causes a shearing force to a cluster of the magnetic viscous fluid to become larger than that in the inner circumferential area.

7 Claims, 12 Drawing Sheets

(56) References Cited

FOREIGN PATENT DOCUMENTS

| | | | | |
|---|---|---|---|---|
| JP | 2013-242013 | A | 12/2013 | |
| JP | 5603856 | B2 | 10/2014 | |
| JP | 2016-080165 | A | 5/2016 | |
| JP | 2017-173951 | A | 9/2017 | |
| WO | WO-2013072125 | A1 * | 5/2013 | ............ B60T 8/3675 |
| WO | WO-2017145857 | A1 * | 8/2017 | ............. F16F 9/535 |

* cited by examiner

OUTPUT TORQUE [mNm]
900
800
700
600
500
400
300
200
100
0
0
0.2
0.4
0.6
0.8
1
1.2
APPLIED VOLTAGE [A]
CUTOUT "NON" (COMPARATIVE EXAMPLE)
NUMBER OF CUTOUTS 4, WIDTH 2 (EXAMPLE 1)
NUMBER OF CUTOUTS 6, WIDTH 2 (EXAMPLE 2)
NUMBER OF CUTOUTS 8, WIDTH 2 (EXAMPLE 3)
NUMBER OF CUTOUTS 6, WIDTH 1 (EXAMPLE 4)
NUMBER OF CUTOUTS 6, WIDTH 4 (EXAMPLE 5)

TORQUE GENERATION APPARATUS

CLAIM OF PRIORITY

This application is a Continuation of International Application No. PCT/JP2019/011815 filed on Mar. 20, 2019, which claims benefit of Japanese Patent Application No. 2018-096109 filed on May 18, 2018. The entire contents of each application noted above are hereby incorporated by reference.

BACKGROUND OF THE INVENTION

1. Field of the Invention

The present invention relate to a torque generation apparatus capable of changing rotational resistance using a magnetic viscous fluid.

2. Description of the Related Art

A tactile interface described in Japanese Patent No. 5603856 includes an element that interacts with a user, a rotating shaft to which the element is rotationally fixed, an element that interacts with a magnetic viscous fluid and that is rotationally fixed to the rotating shaft, and a system for generating a magnetic field in the fluid. The element that interacts with the fluid has at least one cylindrical wall having an opening and/or a relief and/or recessed pattern and a vertical axis. In this configuration, when a magnetic field is applied, magnetic particle chains contained in the magnetic viscous fluid are positioned at the relief to form an obstacle to the deformation of the relief, and their interactive element applies a shearing force to the particle chains, thereby providing an increased braking force with a small volume.

A braking-force transmission apparatus described in Japanese Unexamined Patent Application Publication No. 2011-247403 includes a magnetic disc fixed to a rotation shaft, a magnetic resonance (MR) fluid layer placed above and below the disc, and a coil. An area of the disc aligned with the coil in the axial direction to which an end face of the coil is projected is provided with a void and a magnetic bridge. This configuration provides a compact, high-responsivity MR fluid brake or clutch.

However, the tactile interface described in Japanese Patent No. 5603856 provides an increased braking force by the magnetic particle chains contained in the magnetic viscous fluid forming obstacles to the deformation of the relief but has difficulty in size reduction because of the configuration including a sealed chamber, a bell-shaped element, a permanent magnet, a coil, and so on.

The braking-force transmission apparatus described in Japanese Unexamined Patent Application Publication No. 2011-247403 has a disc diameter larger than the coil diameter in order to reverse the direction of the magnetic field on the inner circumferential side of the disc and the direction of the magnetic field on the outer circumferential side, and therefore has difficulty in size reduction.

SUMMARY OF THE INVENTION

The present invention provides a torque generation apparatus using a magnetic viscous fluid, which is suitable for size reduction and which can provide a large shearing force.

A torque generation apparatus in an aspect of the present invention includes a magnetic disc capable of rotating about a rotation axis, a first yoke and a second yoke disposed opposite sides of the magnetic disc in a first direction parallel to the rotation axis, a magnetic viscous fluid placed between the magnetic disc and the first yoke and the second yoke, a coil disposed so as to overlap with the magnetic disc when viewed in a direction along the first direction, and a third yoke having an area adjacent to the magnetic disc at least outside the magnetic disc and the coil, the third yoke constituting a magnetic path of a magnetic field generated by the coil together with the first yoke and the second yoke. The magnetic disc includes a torque increasing portion at at least one of a surface facing the first yoke and a surface facing the second yoke. The torque increasing portion is disposed in an outer circumferential area of the magnetic disc in a second direction that is a radial direction perpendicular to the first direction, the torque increasing portion increasing a shearing force for a cluster of the magnetic viscous fluid as compared with an inner circumferential area inside the outer circumferential area. The third yoke has a magnetic gap between the third yoke and the first yoke. The magnetic gap is disposed outside an outer circumferential edge of the magnetic disc or at a position overlapping with the outer circumferential edge of the magnetic disc as viewed along the first direction.

This allows a magnetic flux whose principal direction is a magnetic field component crossing between the first yoke and the second yoke to pass through a wide area of the magnetic disc except the outer circumferential edge so as to generate a resisting force (torque) in the direction based on the direction of the magnetic flux. This therefore allows for providing a large shearing force as compared with a configuration without the torque increasing portion, without increasing the size of the apparatus.

In the torque generation apparatus of the present invention, the first yoke preferably includes an extending portion between the coil and the magnetic disc, the extending portion overlapping with the coil and the magnetic disc as viewed along the first direction.

This allows the magnetic disc to reliably pass magnetic lines through not only the inner circumferential area but also the outer circumferential area including the torque increasing portion, thereby contributing to generation of a large shearing force.

In the torque generation apparatus of the present invention, the torque increasing portion preferably includes an opening passing through the magnetic disc in a thickness direction. The opening is preferably a long hole that is long in the second direction.

This allows for forming a cluster of magnetic particles according to the magnetic flux passing through the opening of the magnetic disc between the second yoke and the first yoke, thereby generating a large resisting force (torque).

In the torque generation apparatus of the present invention, the torque increasing portion is preferably formed as protrusions and depressions of the magnetic disc in a thickness direction. The torque increasing portion preferably has a configuration in which the protrusions and depressions are provided concentrically about the rotation axis.

This allows for forming protrusions and depressions in the shape of the gap between the magnetic disc and the first yoke and the second yoke, thereby generating a large resisting force (torque).

In the torque generation apparatus of the present invention, a gap between the first yoke and the second yoke is preferably smaller in the torque increasing portion than in the inner circumferential area of the magnetic disc. The first yoke and the second yoke each preferably have a recessed portion for providing a large gap with the magnetic disc in an area facing the inner circumferential area of the magnetic disc.

Providing the torque increasing portion allows for relatively increasing the gap between the first yoke and the second yoke in the inner circumferential area, thereby allowing the outer circumferential area with a small gap to generate a larger resisting force (torque), as a torque increasing portion. The recessed portion in the area facing the inner circumferential area allows for suppressing the initial torque.

In the torque generation apparatus of the present invention, a distance between an outer circumferential edge of the magnetic disc and an outer side of the third yoke is preferably not constant in a plane perpendicular to the rotation axis. The third yoke is preferably substantially quadrangular in plan view.

This provides a wide magnetic path in the side wall of the third yoke corresponding to the corners, ensuring that a magnetic field is generated along the magnetic path.

BRIEF DESCRIPTION OF THE DRAWINGS

FIGS. 4A and 4B are cross-sectional views taken along line IV-IV of FIG. 1A, in which FIG. 4B is a conceptual diagram illustrating a magnetic field generated by an exciting coil;

FIGS. 5A and 5B are cross-sectional views taken along line V-V of FIG. 1A, in which FIG. 5B is a conceptual diagram illustrating a magnetic field generated by the exciting coil;

DESCRIPTION OF THE PREFERRED EMBODIMENTS

Basic Configuration

Referring to FIGS. 1 to 7, the basic configuration of the torque generation apparatus will be described. In this basic configuration, the upper surface 124 and the lower surface 125 of a magnetic disc 120 have a flat, substantially circular disc shape. The specific shapes in the embodiments will be described later.

Figure 1A:
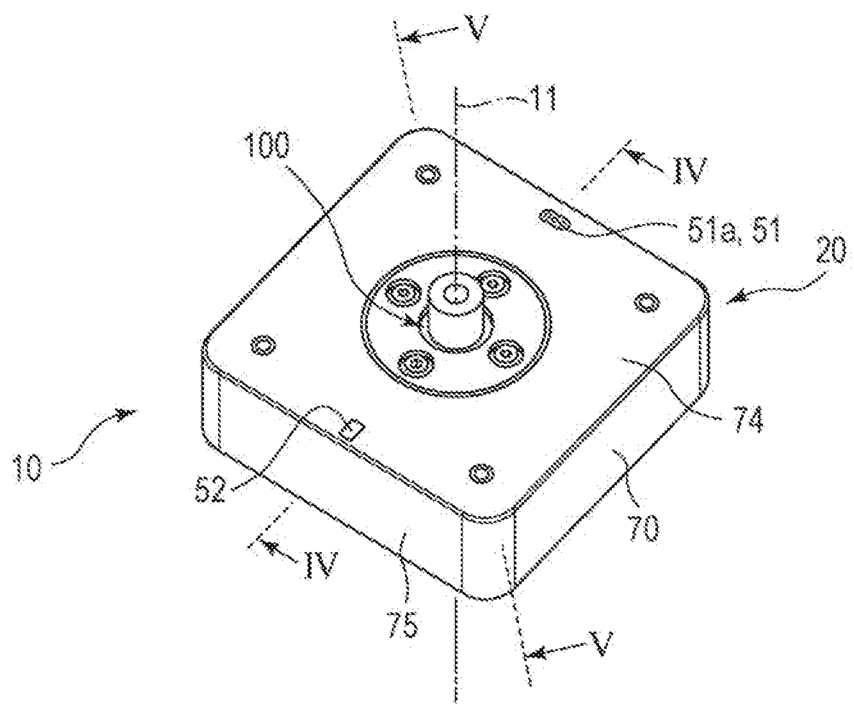
FIG. 1A is a perspective view of a torque generation apparatus viewed from above illustrating the basic configuration thereof.
Figure 1B:
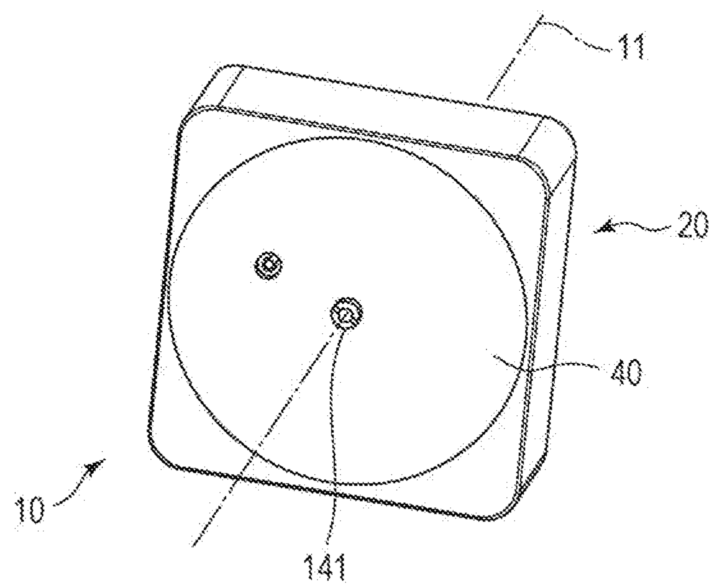
FIG. 1B is a perspective view of the torque generation apparatus viewed from below.
Figure 2:
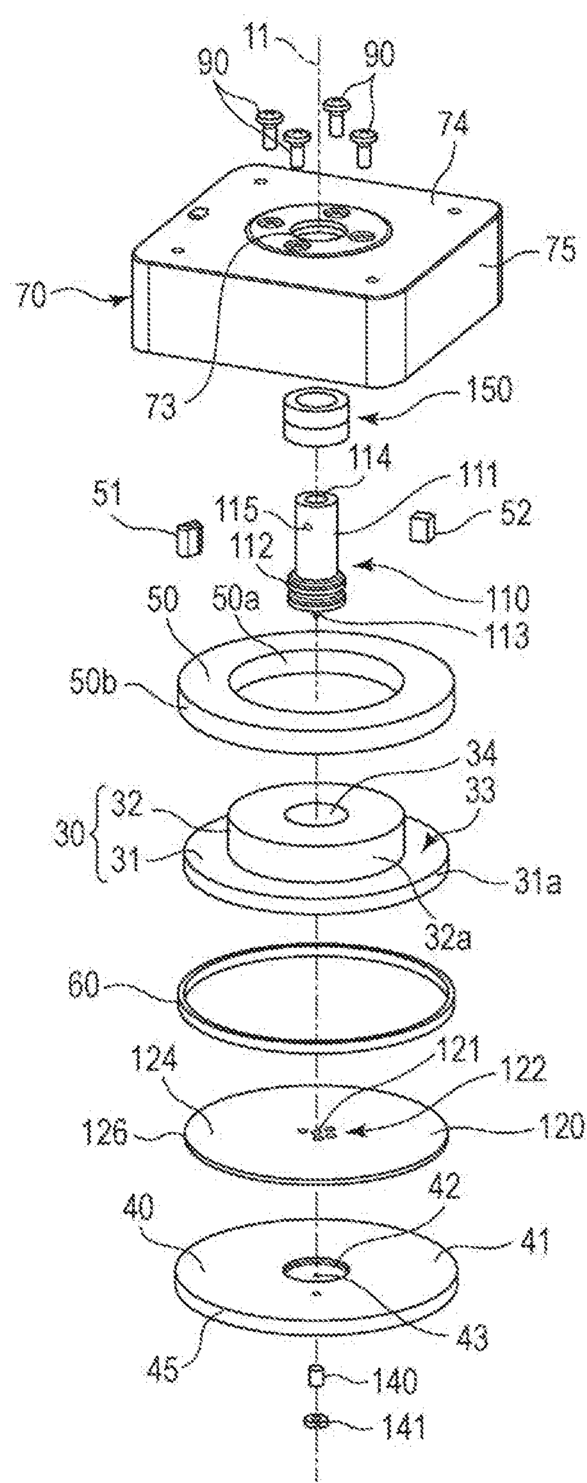
FIG. 2 is an exploded perspective view of the torque generation apparatus illustrated in FIGS. 1A and 1B viewed from above.
Figure 3:
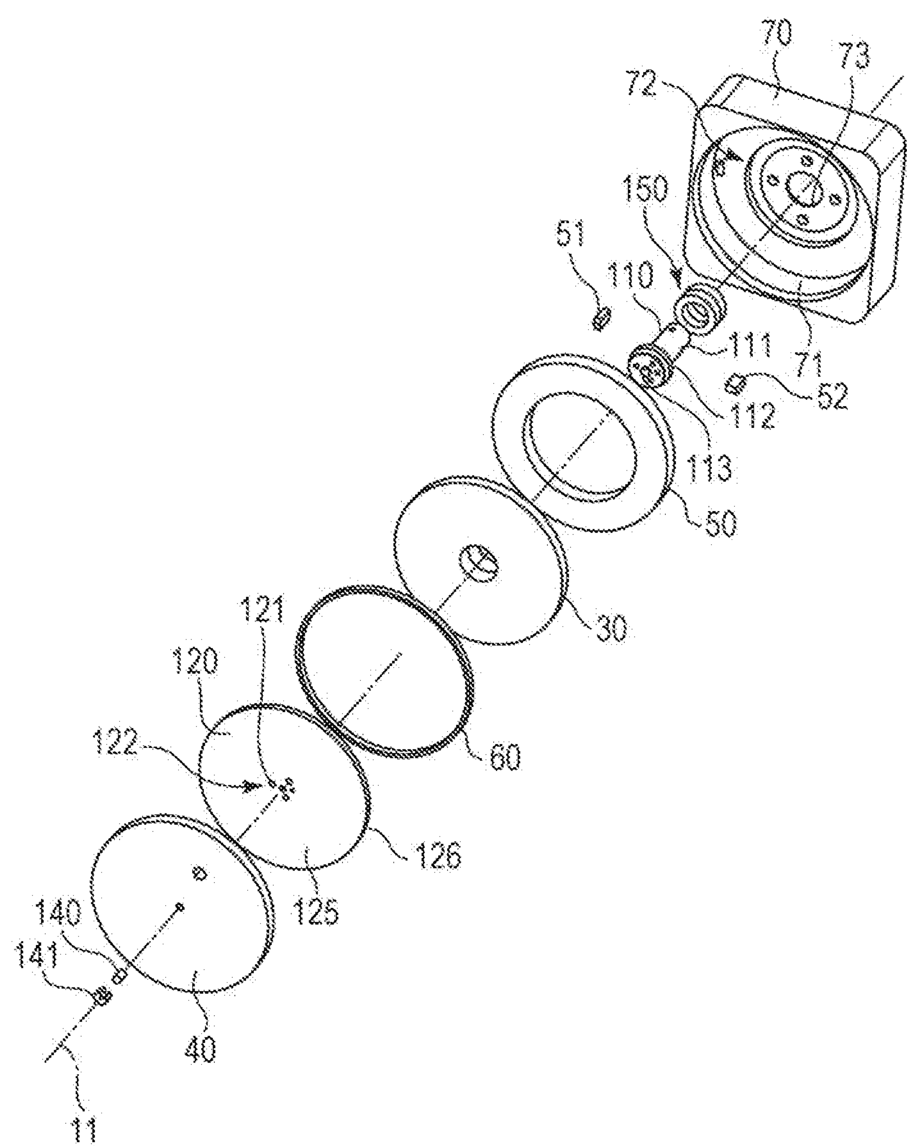
FIG. 3 is an exploded perspective view of the torque generation apparatus illustrated in FIGS. 1A and 1B viewed from below.
Figure 4A:
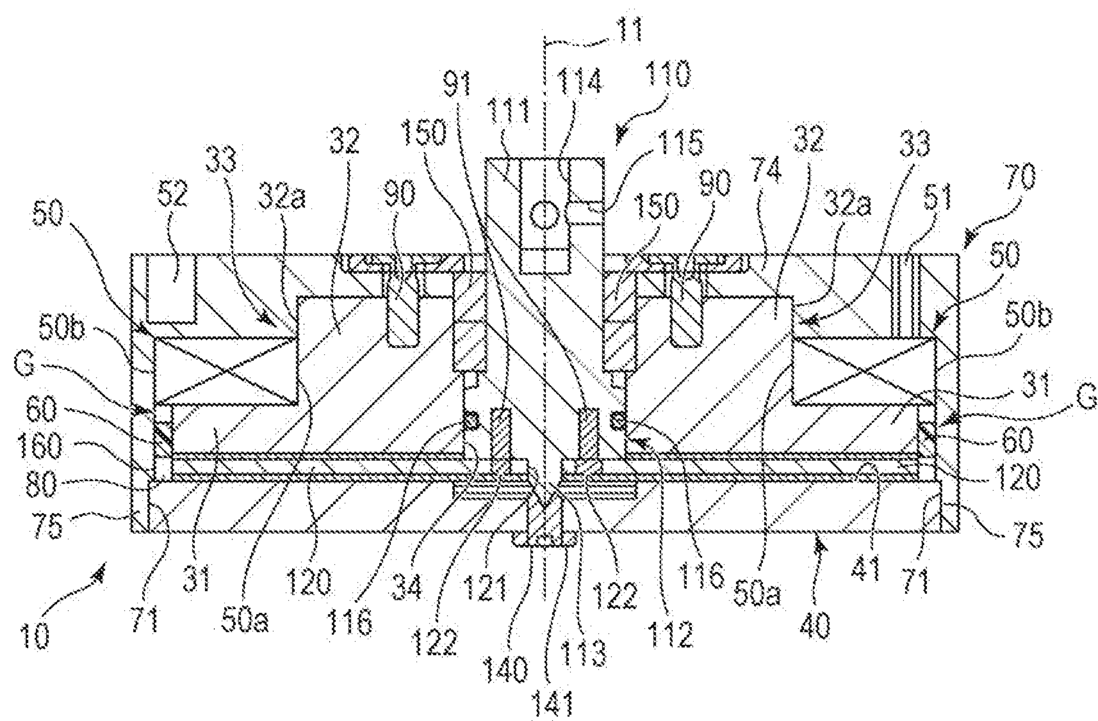
Figure 4B:
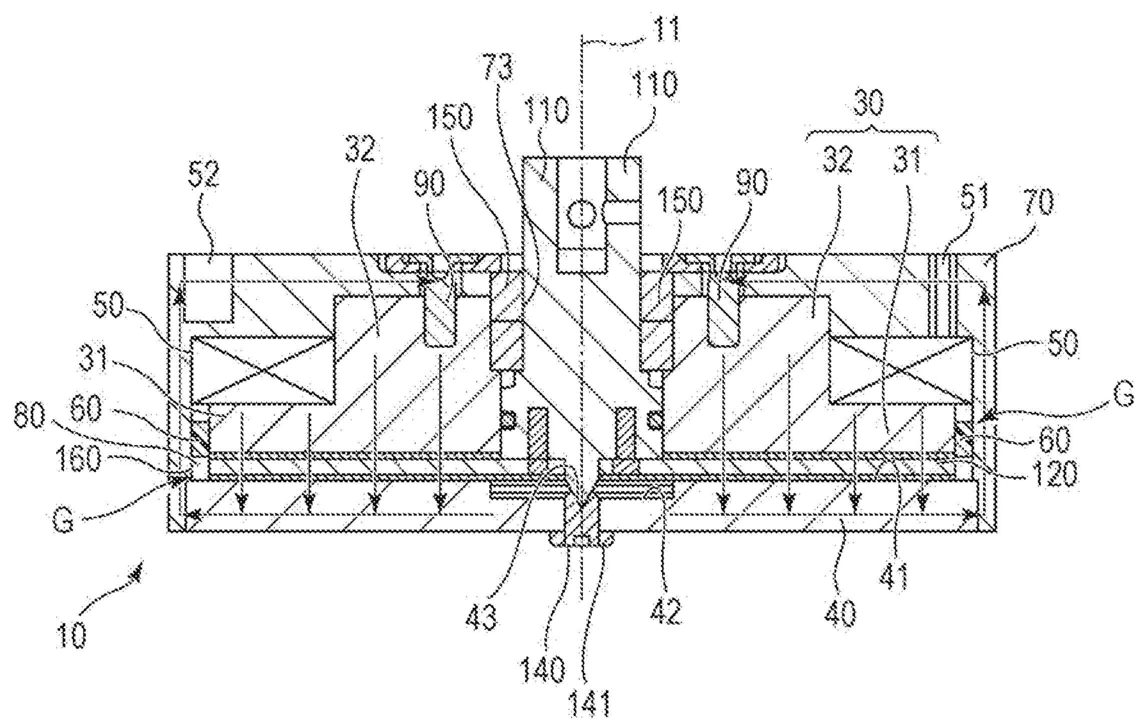
Figure 5A:
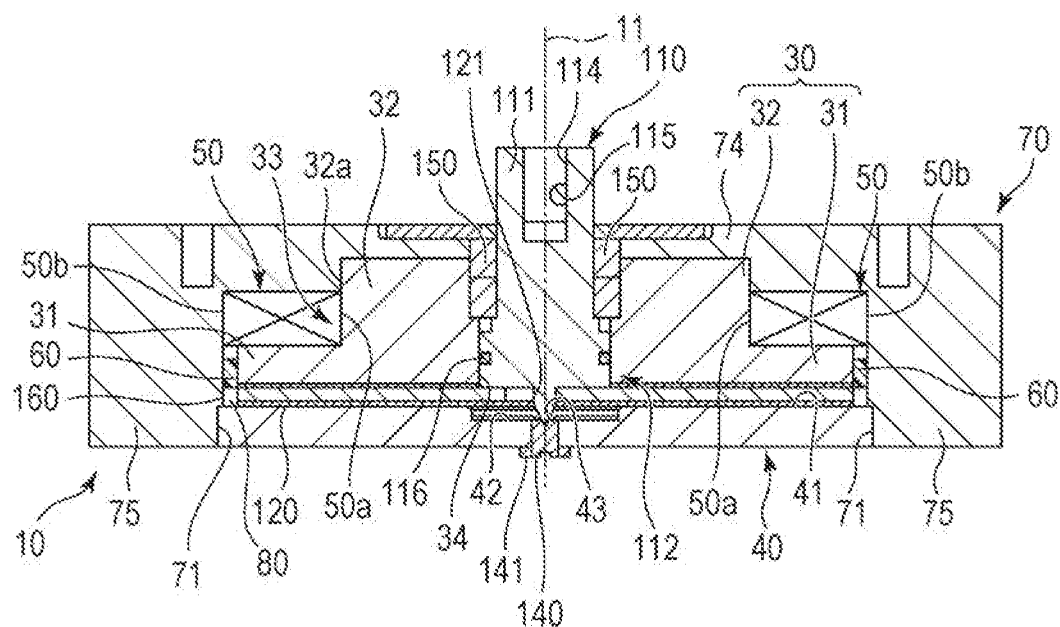
Figure 5B:
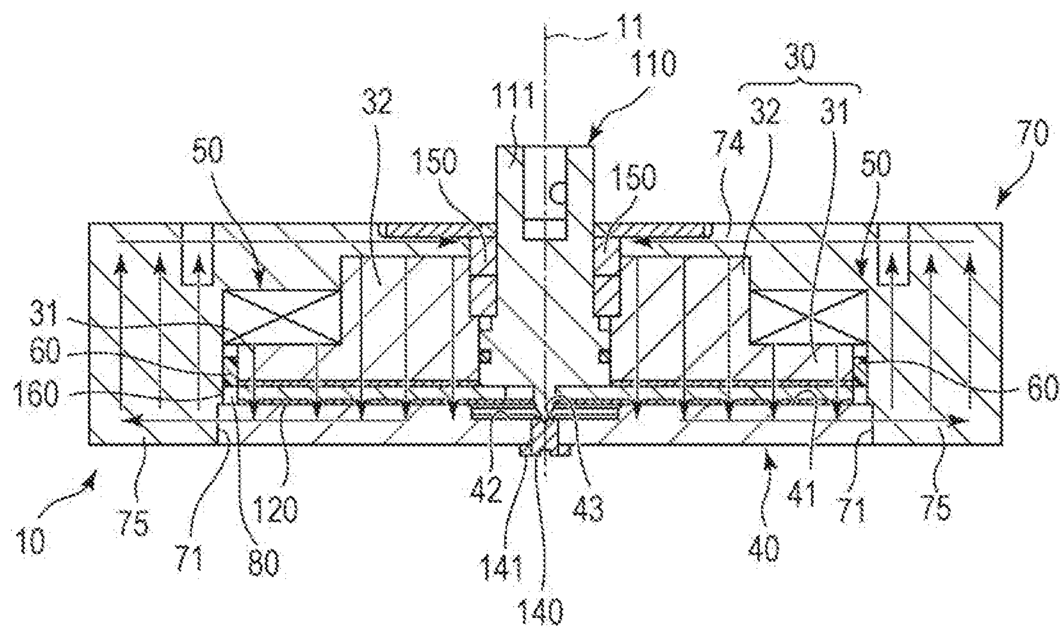
Figure 6:
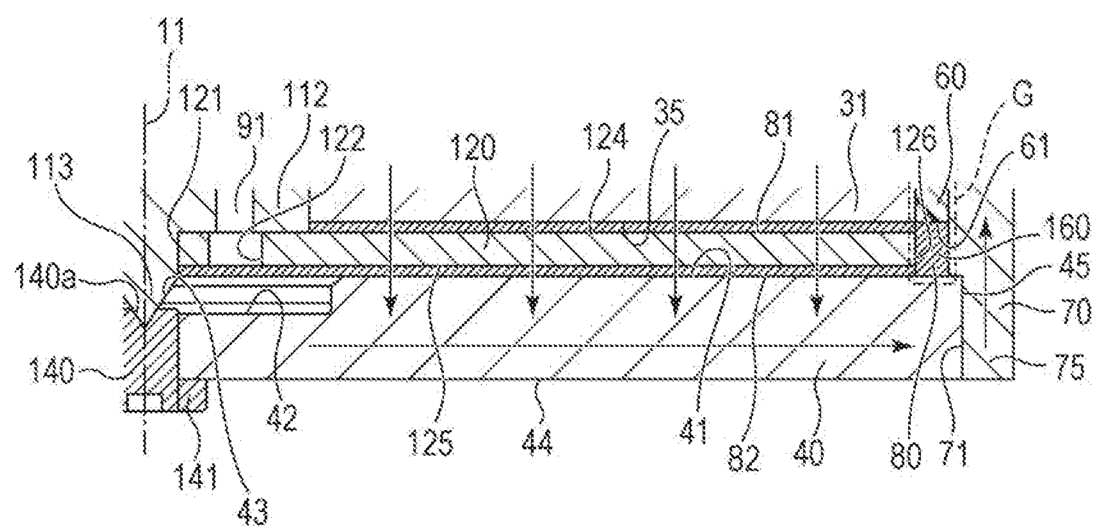
FIG. 6 is a partial enlarged diagram of FIG. 4A.
Figure 7:
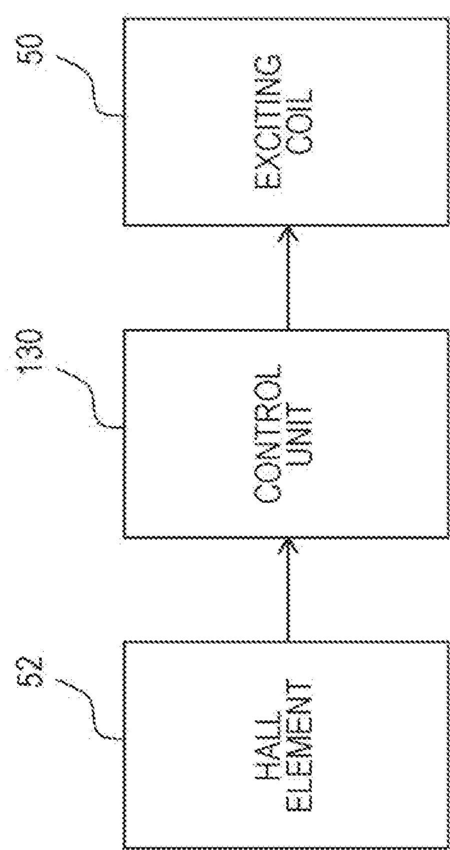
FIG. 7 is a block diagram illustrating the control system of the torque generation apparatus illustrated in FIGS. 1A and 1B.

FIG. 1A is a perspective view of a torque generation apparatus 10 with the basic configuration viewed from above, and FIG. 1B is a perspective view of the torque generation apparatus 10 viewed from below. FIGS. 2 and 3 are exploded perspective views of the torque generation apparatus 10. FIG. 2 is an exploded perspective view viewed from above, and FIG. 3 is an exploded perspective view viewed from below. FIGS. 4A and 4B are cross-sectional views taken along line IV-IV of FIG. 1A, in which FIG. 4B is an explanatory conceptual diagram illustrating a magnetic field generated by an exciting coil 50. FIGS. 5A and 5B are cross-sectional views taken along line V-V in FIG. 1A, in which FIG. 5B is a conceptual diagram illustrating a magnetic field generated by the exciting coil 50. FIG. 6 is a partial enlarged diagram of FIG. 4A. FIG. 7 is a block diagram illustrating the control system of the torque generation apparatus 10.

In FIG. 1A to FIG. 6, the vertical direction is defined as a direction along a central axis 11 for the convenience of description. However, this is not intended to limit the direction in actual use. The direction along the central axis 11 is referred to as a first direction, and the radial direction perpendicular to the central axis 11 from the central axis 11 is referred to as a second direction. In the following description, a state viewed from above to below is sometimes referred to as a plan view. In FIGS. 2 and 3, some screws and the magnetic viscous fluid are omitted.

As illustrated in FIGS. 1A and 1B, the torque generation apparatus 10 includes a holding unit 20, a Hall element 52 serving as a magnetic measuring unit, and an operating unit 100. The operating unit 100 includes a shaft 110 and a magnetic disc 120 and is supported by the holding unit 20 so as to be rotatable in opposite directions about the central axis 11 (the axis of rotation). The operating unit 100 is rotatably supported by the holding unit 20 via a support member 140 and a radial bearing 150 (FIG. 2). As illustrated in FIGS. 4A to 6, a gap 80 provided in the torque generation apparatus 10 is filled with a magnetic viscous fluid 160.

The holding unit 20 includes a first yoke 30, a second yoke 40, an exciting coil 50 serving as a magnetic-field generation unit, an annular member 60, and a third yoke 70 serving as an upper casing. The first yoke 30, the second yoke 40, and the third yoke 70 are separately processed. Any of the first yoke 30, the second yoke 40, and the third yoke 70 may be combined into one piece.

As illustrated in FIG. 2, the first yoke 30 includes an annular portion 31 and a cylindrical portion 32 extending upward from the upper surface of the annular portion 31 concentrically and integrally with the annular portion 31. The annular portion 31 and the cylindrical portion 32 are in the form of a circle centered on the central axis 11 in plan view. The outside diameter of the cylindrical portion 32 is smaller than the outside diameter of the annular portion 31. Because of the difference in outside diameter between the annular portion 31 and the cylindrical portion 32, a step portion 33 is formed outside the outer circumferential surface 32*a* of the cylindrical portion 32. The first yoke 30 has an inner circumferential surface 34 having a circular shape in plan view centered on the central axis 11. The inner circumferential surface 34 passes through the annular portion 31 and the cylindrical portion 32 along the central axis 11, and the inner diameter of the inner circumferential surface 34 is set so as to change according to the position in the vertical direction.

As illustrated in FIG. 4A, an exciting coil 50 serving as a magnetic-field generation unit is disposed on the step portion 33 of the first yoke 30. The inner circumference 50*a* of the exciting coil 50 has an annular shape conforming to the outer circumferential surface 32*a* of the cylindrical portion 32, and the outer circumference 50*b* is positioned radially outside the outer circumferential surface 31*a* of the annular portion 31. Thus, the exciting coil 50 overlaps with the annular portion 31, which is an extending portion, in plan view. The exciting coil 50 is a coil including a conductive wire wound around the central axis 11. The exciting coil 50 is electrically connected to a connecting member 51. An electric current is supplied to an input portion 51*a* of the connecting member 51 exposed from the top of the third yoke 70 through a path (not illustrated). When the exciting coil 50 is supplied with an electric current, a magnetic field is generated.

The annular member 60 is fixed to the annular portion 31 of the first yoke 30 along the outer circumferential surface 31*a*. The annular member 60 is shaped like a ring and is made of a non-magnetic material, such as synthetic resin. The annular member 60 fixed to the first yoke 30 has a circular shape with substantially the same outside diameter as the outside diameter of the exciting coil 50 disposed on the step portion 33 in plan view. As illustrated in FIG. 6, the lower surface 61 of the annular member 60 is substantially flush with the bottom surface 35 of the first yoke 30 and extends in the direction perpendicular to the central axis 11. The annular member 60 has a thickness in the radial direction that allows for preventing the magnetic field generated by the exciting coil 50 from passing in the radial direction through the annular member 60. The radial thickness of the annular member 60 may change in the vertical direction.

As illustrated in FIG. 2, the second yoke 40 has a disc shape and is disposed below the first yoke 30. The second yoke 40 has an upper surface 41 perpendicular to the vertical direction extending along the central axis 11. This upper surface 41 has a ring-shaped groove 42 that opens upward around the central axis 11. A hole 43 passing through the second yoke 40 in the vertical direction is formed at the center of the groove 42. As illustrated in FIG. 6, a support member (a pivot support member) 140 extending in the vertical direction is inserted in the hole 43. The support member 140 is fixed to the second yoke 40 with a holder 141 fixed to the lower surface 44 of the second yoke 40. The support member 140 has a receiving portion 140*a*, which is a recessed portion that opens upward, with which an end 113 of the shaft 110 is rotatable received.

The yokes 30 and 40 do not necessarily need to be circular in plan view. The yoke does not need to be the combination of the first yoke 30 and the second yoke 40, as described above, but may have a rectangular planar shape depending on the separation position.

As illustrated in FIG. 6, the bottom surface 35 of the first yoke 30, the lower surface 61 of the annular member 60, and the upper surface 41 of the second yoke 40 are substantially parallel to each other, and the gap 80 is formed between the bottom surface 35 and the upper surface 41.

As illustrated in FIG. 3, the third yoke 70 has a space 72 that houses (1) the exciting coil 50, the first yoke 30, and the annular member 60, (2) the connecting member 51 and the Hall element 52, and (3) the radial bearing 150, the shaft 110, and the magnetic disc 120. This space 72 is shaped like a circle in plan view by an inner circumferential surface 71 and is closed at the lower part by the second yoke 40. The space 72 is surrounded by the upper wall 74 and the side wall 75 of the third yoke 70. As illustrated in FIGS. 1A and 1B, the third yoke 70 is substantially rectangular in plan view, and the space 72 is circular in plan view, as described above. For this reason, the shape of the side wall 75 in plan view, that is, the shape of the outer side of the side wall 75 of the third yoke 70 in plan view is thick at the corners and thin at the sides.

The second yoke 40 is fixed to the third yoke 70 with screws (not illustrated) passing through the side wall 75 of the third yoke 70 in the radial direction. This causes the outer circumferential surface 45 of the second yoke 40 to be fixed in contact with the side wall 75 of the third yoke 70, and the second yoke 40 and the third yoke 70 to be magnetically connected to each other (see FIG. 6). The second yoke 40 and the third yoke 70 may be fixed with a means other than the screws, for example, welding.

The use of the first yoke 30, the second yoke 40, and the third yoke 70 allows for forming a magnetic path (a magnetic circuit) that makes the magnetic field generated by the exciting coil 50 form a closed loop.

As illustrated in FIGS. 4A and 4B, the third yoke 70 and the first yoke 30 are fixed to each other with a plurality of screws 90 that passes through the upper wall 74 of the third yoke 70 in the vertical direction. Thus, the top of the first yoke 30 and the upper wall 74 of the third yoke 70 are fixed in a contact state, where the first yoke 30 and the third yoke 70 are magnetically connected.

Meanwhile, the annular member 60 made of a non-magnetic material is fixed to the outer circumferential surface 31*a* of the annular portion 31 of the first yoke 30, and the outer circumferential surface of the annular member 60 is in contact with the inner circumferential surface 71 of the third yoke 70. The annular portion 31 of the first yoke 30 and the side wall 75 of the third yoke 70 are therefore separated from each other by the annular member 60 in the direction perpendicular to the central axis 11 to form a magnetic gap G. This magnetic gap G extends, in the first direction along the central axis 11, from the bottom surface of the exciting coil 50 to the upper surface 41 of the second yoke 40.

In the second direction, or the radial direction, the magnetic gap G corresponds to the gap between the outer circumferential edge 126 of the magnetic disc 120 disposed in the gap 80 between the first yoke 30 and the second yoke 40 and the inner circumferential surface 71 of the third yoke 70. Providing the magnetic gap G allows for preventing or reducing passing of the magnetic flus of the magnetic field generated by the exciting coil 50 from the annular portion 31 of the first yoke 30 to the side wall 75 of the third yoke 70 and from the magnetic disc 120 to the side wall 75 of the third yoke 70 along the direction perpendicular to the central axis 11. The third yoke 70 is provided with an area adjacent to the magnetic disc 120 outside the magnetic disc 120 and the exciting coil 50 by the magnetic gap G.

With the above configuration, when an electric current is applied to the exciting coil 50, a magnetic field is formed which flows in the direction schematically indicated by the arrows in FIG. 4B. When an electric current is applied in the opposite direction to the exciting coil 50, a magnetic field flowing in the opposite direction from that in FIG. 4B is formed. In the example illustrated in FIG. 4B, a magnetic flux flows along the central axis 11 from the first yoke 30 across the magnetic disc 120 toward the second yoke 40. The magnetic flux flows, in the second yoke 40, in the direction away from the central axis 11, and in the side wall 75 of the third yoke 70, flows from below to above along the central axis 11.

The flux flows, in the upper wall 74 of the third yoke 70, in the direction approaching the central axis 11, and in an area corresponding to the inside of the exciting coil 50, flows from above to below, that is, toward the cylindrical portion 32 of the first yoke 30, and inside the exciting coil 50, travels downward to cross the magnetic disc 120 again to reach the second yoke 40.

In the magnetic field with such a magnetic path, the presence of the magnetic gap G restricts the passage of the magnetic flux from the annular portion 31 and the magnetic disc 120 to the side wall 75 of the third yoke 70. Furthermore, since the second yoke 40 and the side wall 75 of the third yoke 70 are magnetically connected, a magnetic path from the second yoke 40 to the side wall 75 is provided. Furthermore, the side wall 75 of the third yoke 70 is thick at the corners and is thin at the sides in plan view. This allows for providing a wide magnetic path particularly in the side wall 75 corresponding to the corners, which ensures generation of a magnetic field along the magnetic path (see FIG. 5B). Although the third yoke 70 in the present embodiment is substantially rectangular in plan view, the third yoke 70 may have a circular shape or any other shape in plan view that provides a magnetic path.

The third yoke 70 has a substantially columnar through-hole 73 in an area including the central axis 11. The through-hole 73 passes vertically through the third yoke 70. The space in the through-hole 73 communicates with the space surrounded by the inner circumferential surface 34 of the first yoke 30 in the vertical direction.

Next, the structure of the operating unit 100 will be described.

As illustrated in FIGS. 2 and 3, the shaft 110 serving as an operating shaft is a rod-like member extending vertically along the central axis 11 and includes an upper shaft portion 111 and a grooved portion 112 provided lower than the shaft portion 111. The grooved portion 112 has a spiral groove, in the outer circumferential surface, centered on the central axis 11. An end 113 at the center of the lower surface of the grooved portion 112 has a shape tapering toward the bottom.

As illustrated in FIG. 3, the magnetic disc 120 is a disc-shaped member made of a magnetic material and disposed at right angles to the vertical direction. The magnetic disc 120 has a central hole 121 passing vertically through the center of the circular plane and a plurality of through-holes 122, around the central hole 121, that passes vertically through the magnetic disc 120. The magnetic disc 120 is fixed to the shaft 110 by fitting the shanks of screws 91, which are passed through the through-holes 122 from below, into the grooved portion 112 of the shaft 110.

As illustrated in FIGS. 4A and 4B, the shaft portion 111 of the shaft 110 is rotatably supported by the radial bearing 150, and the end 113 below the grooved portion 112 is pivotally supported by the support member (a pivot support member) 140 through the central hole 121 of the magnetic disc 120. The radial bearing 150 is supported at a predetermined position in the vertical direction by the third yoke 70 and the first yoke 30. The groove of the grooved portion 112 is fitted with an O-ring 116. This allows the shaft 110 to be rotatably supported about the central axis 11 with respect to the first yoke 30, the second yoke 40, and the third yoke 70 while maintaining the adhesion to the first yoke 30. The upper part of the shaft portion 111 is exposed from above the third yoke 70, and the exposed portion of the shaft portion 111 has connecting holes 114 and 115 for connecting components that are necessary for an inputting operation to the shaft 110.

As illustrated in FIGS. 4A to 6, the magnetic disc 120 is disposed in a gap 80 between the first yoke 30 and the second yoke 40 so as to extend in the direction perpendicular to the central axis 11. Thus, the magnetic disc 120 is positioned so as to overlap with the exciting coil 50 in the direction along the central axis 11. The magnetic disc 120 therefore overlaps with the annular portion 31 which is an extending portion in plan view. The magnetic disc 120 and the exciting coil 50 need only to be positioned so as to at least partly overlap in the direction along the central axis 11. As illustrated in FIG. 6, the magnetic disc 120 has two opposing surfaces, the upper surface 124 and the lower surface 125, which are perpendicular to the first direction along the central axis 11. There is a gap 81 between the upper surface 124 of the magnetic disc 120 and the bottom surface 35 of the first yoke 30, and there is a gap 82 between the lower surface 125 of the magnetic disc 120 and the upper surface 41 of the second yoke 40. The outer circumferential edge 126 of the magnetic disc 120 and the side wall 75 of the third yoke 70 are separated by the magnetic gap G.

When the magnetic disc 120 is rotated relative to the first yoke 30 and the second yoke 40 by rotating the shaft 110, the vertical distance between the upper surface 124 of the magnetic disc 120 and the bottom surface 35 of the first yoke 30 is kept substantially constant, the vertical distance between the lower surface 125 of the magnetic disc 120 and the upper surface 41 of the second yoke 40 is kept substantially constant, and the radial distance between the outer circumferential edge 126 of the magnetic disc 120 and the inner circumferential surface 71 of the side wall 75 is also kept substantially constant.

As illustrated in FIGS. 4A to 6, the gap 80 around the magnetic disc 120 is filled with a magnetic viscous fluid 160. Accordingly, the magnetic viscous fluid 160 is present also in the gap 81 vertically sandwiched between the upper surface 124 of the magnetic disc 120 and the bottom surface 35 of the first yoke 30 and in the gap 82 sandwiched vertically between the lower surface 125 of the magnetic disc 120 and the upper surface 41 of the second yoke 40. The magnetic viscous fluid 160 is present also in the space (magnetic gap G) radially sandwiched between the outer circumferential edge 126 of the magnetic disc 120 and the side wall 75 of the third yoke 70. The gap 80 around the magnetic disc 120 is sealed with the shaft 110, the O-ring 116, the support member 140, the first yoke 30, the second yoke 40, the third yoke 70, and the annular member 60. This ensures that the magnetic viscous fluid 160 is held in the gap 80.

Not the whole of the gap 80 may be filled with the magnetic viscous fluid 160. For example, the magnetic viscous fluid 160 may be present on only one of the upper surface 124 and the lower surface 125. The magnetic viscous fluid 160 may be disposed in the gap 80 by being injected into the gap 80 or by being applied to the upper surface 124 or the lower surface 125 of the magnetic disc 120, the bottom surface 35 of the annular portion 31, the upper surface 41 of the second yoke 40, the lower surface 61 of the annular member 60, or the inner circumferential surface 71 of the third yoke 70.

The magnetic viscous fluid 160 is a substance whose viscosity changes when a magnetic field is applied, for example, a fluid in which particles made of a magnetic material (magnetic particles) are dispersed in a non-magnetic liquid (solvent). Preferable examples of the magnetic particles contained in the magnetic viscous fluid 160 include iron-based particles containing carbon and ferrite particles. A preferable example of the iron-based particles containing carbon contains 0.15% or more of carbon. The diameter of each magnetic particle is preferably 0.5 μm or more, and more preferably, 1 μm or more. The solvent and the magnetic particles of the magnetic viscous fluid 160 are preferably selected so as to make the magnetic particles less prone to being precipitated under gravity. Furthermore, the magnetic viscous fluid 160 preferably contains a coupling material for preventing precipitation of the magnetic particles.

When an electric current is applied to the exciting coil 50, a magnetic field as illustrated in FIG. 4B is generated, as described above, and a magnetic flux only in the vertical direction crosses the magnetic disc 120, in which a magnetic flux along the radial direction is not generated, or even if it is generate, its magnetic flux density is low. This magnetic field causes, in the second yoke 40, magnetic lines along the radial direction, and causes, in the side wall 75 of the third yoke 70, magnetic lines in the vertical direction in the direction opposite to the magnetic lines in the magnetic disc 120. In the upper wall 74 of the third yoke 70, magnetic lines in the radial direction in the direction opposite to the magnetic lines in the second yoke 40 are generated.

In the magnetic viscous fluid 160, the magnetic particles are dispersed in the solvent when no magnetic field due to the exciting coil 50 is generated. For this reason, when the operator operates the shaft 110, the holding unit 20 rotates relative to the operating unit 100 without receiving a large resistive force. When a magnetic flux remains in the yoke, with the exciting coil 50 not energized, a resistive torque remains in the shaft 110 according to the density of the residual magnetic flux.

In contrast, when an electric current is applied to the exciting coil 50 to generate a magnetic field, the magnetic viscous fluid 160 is given a magnetic field along the vertical direction. This magnetic field causes the magnetic particles dispersed in the magnetic viscous fluid 160 to gather along the magnetic lines, and the magnetic particles aligned along the vertical direction to be magnetically coupled to form a cluster. When a force to rotate the shaft 110 around the central axis 11 is applied in this state, a shearing force acts on the coupled magnetic particles, and a resisting force (torque) due to the magnetic particles is generated. This allows the operator to feel a resisting force as compared with a state in which no magnetic field is generated.

The use of the magnetic disc 120 expanding from the shaft 110 radially outward in a disc shape, as described above, allows the magnetic viscous fluid 160 to be disposed in a wider range than only with the shaft 110. The magnitude of the resisting force of the magnetic viscous fluid 160 depends on the range of the magnetic viscous fluid 160 sandwiched between the bottom surface 35 of the first yoke 30 or the upper surface 41 of the second yoke 40 in the vertical direction. In particular, the magnitude of the resisting force due to the magnetic viscous fluid 160 when the magnetic disc 120 is rotated by the operation of the shaft 110 depends on the area of the magnetic viscous fluid 160 on the surface perpendicular to the rotating direction. Thus, the control range of the resisting force (torque) can be increased with an increase in the placement range of the magnetic viscous fluid 160.

FIG. 7 is a block diagram of the control system of the torque generation apparatus 10. The torque generation apparatus 10 includes a control unit 130 in addition to the exciting coil 50 and the Hall element 52 described above.

As illustrated in FIG. 4B, the Hall element 52 serving as a magnetic measuring unit is disposed on the magnetic path of the magnetic field generated by applying an electric current to the exciting coil 50. More specifically, the Hall element 52 is disposed, in the upper wall 74 of the third yoke 70, above the exciting coil 50. The disposition to this position is performed by inserting the Hall element 52 into the recessed portion provided in the upper wall 74. The Hall element 52 is fixed by adhesion. Disposing the Hall element 52 on the magnetic path of the magnetic field generated by the exciting coil 50 in this way allows for accurately measuring the magnetism due to the magnetic field and also a residual magnetic field after the application of the electric current to the exciting coil 50 is stopped. The Hall element 52 is preferably disposed at a position where a value proportional to a change in the magnetic flux when an electric current is applied to the exciting coil 50 to guide the magnetic flux to the periphery of the magnetic disc 120 can be detected, for example, in the vicinity of the four thick corners of the third yoke 70.

The Hall element 52 can also be disposed at any other position on the magnetic path of the magnetic field generated by the exciting coil 50. The magnetic measuring unit is not limited to the Hall element but may be a magnetoresistive sensor.

The control unit 130 controls the magnitude of the electric current to be applied to the exciting coil 50 according to the magnitude of the magnetic field measured by the Hall element 52, thereby controlling the magnitude of the magnetic field that the exciting coil 50 generates. The control unit 130 includes, for example, a central processing unit and a storage unit, and executes control by executing a program stored in the storage unit with the central processing unit. The relationship between the magnetic field measured by the Hall element 52 and the electric current to be applied to the exciting coil 50 may be calculated in sequence, may be specified on the basis of a correspondence table created in advance, or may be specified using another method. Such control allows the residual magnetic field to be brought to substantially zero, providing a stable operational feeling to the operator.

In place of the control for bringing the residual magnetic field to substantially zero, control for bringing the residual magnetic field to a substantially fixed value may be employed. This also allows for providing a stable operating feeling to the operator. Keeping the residual magnetic flux density to a fixed value, for example, 3 mT or more, under this control, can prevent the magnetic particles in the magnetic viscous fluid 160 from being precipitated by gravity when an electric current is not applied to the exciting coil 50 for a long time, thereby preventing the feel on the operator from changing.

In addition to the Hall element 52, a detection unit for detecting the relative position of the holding unit 20 and the operating unit 100 using a mechanical, electromagnetic, optical, or another method may be provided. An example of the detection unit is a rotary encoder. A configuration without the magnetic measuring unit may also be employed.

First Embodiment

Figure 8A:
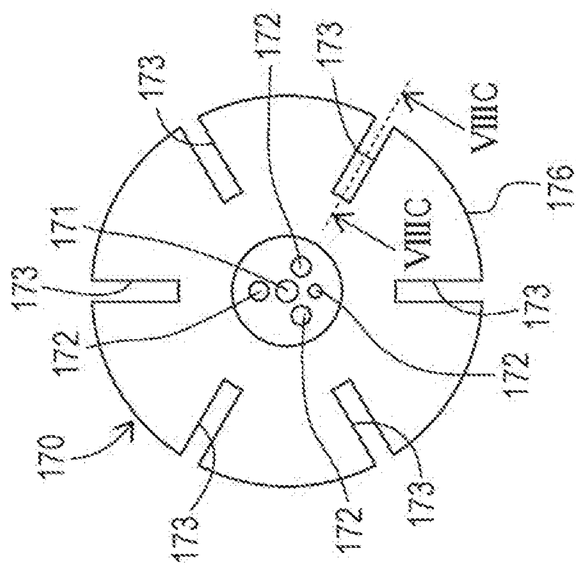
FIG. 8A is a plan view of a magnetic disc of a first embodiment illustrating the configuration thereof.
Figure 8B:
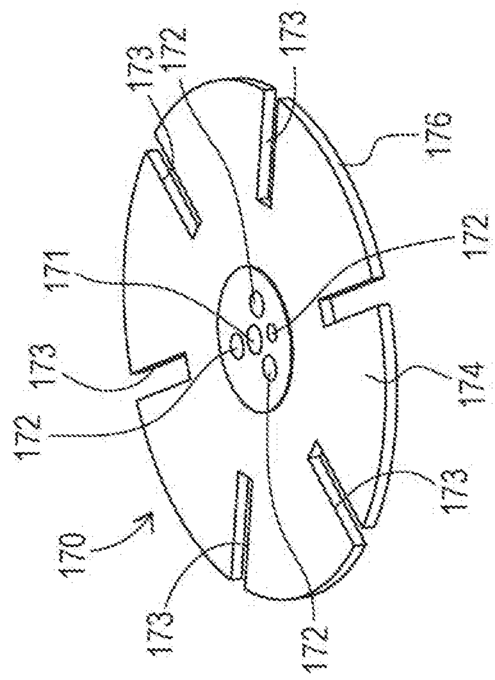
FIG. 8B is a perspective view of the magnetic disc in FIG. 8A.
Figure 8C:
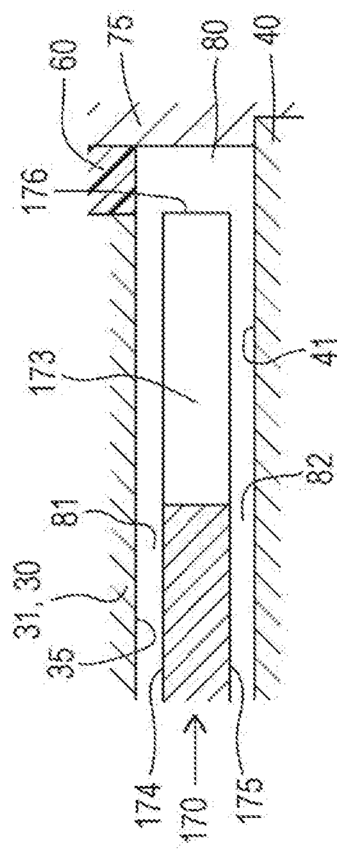
FIG. 8C is a cross-sectional view taken along line VIIIC-VIIIC of FIG. 8A.
Figure 8D:
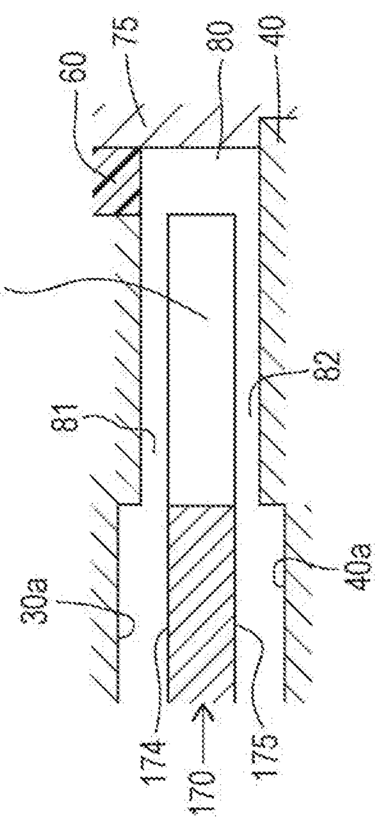
FIG. 8D is a cross-sectional view of a modification of the first embodiment illustrating the configuration thereof.
Figure 9:
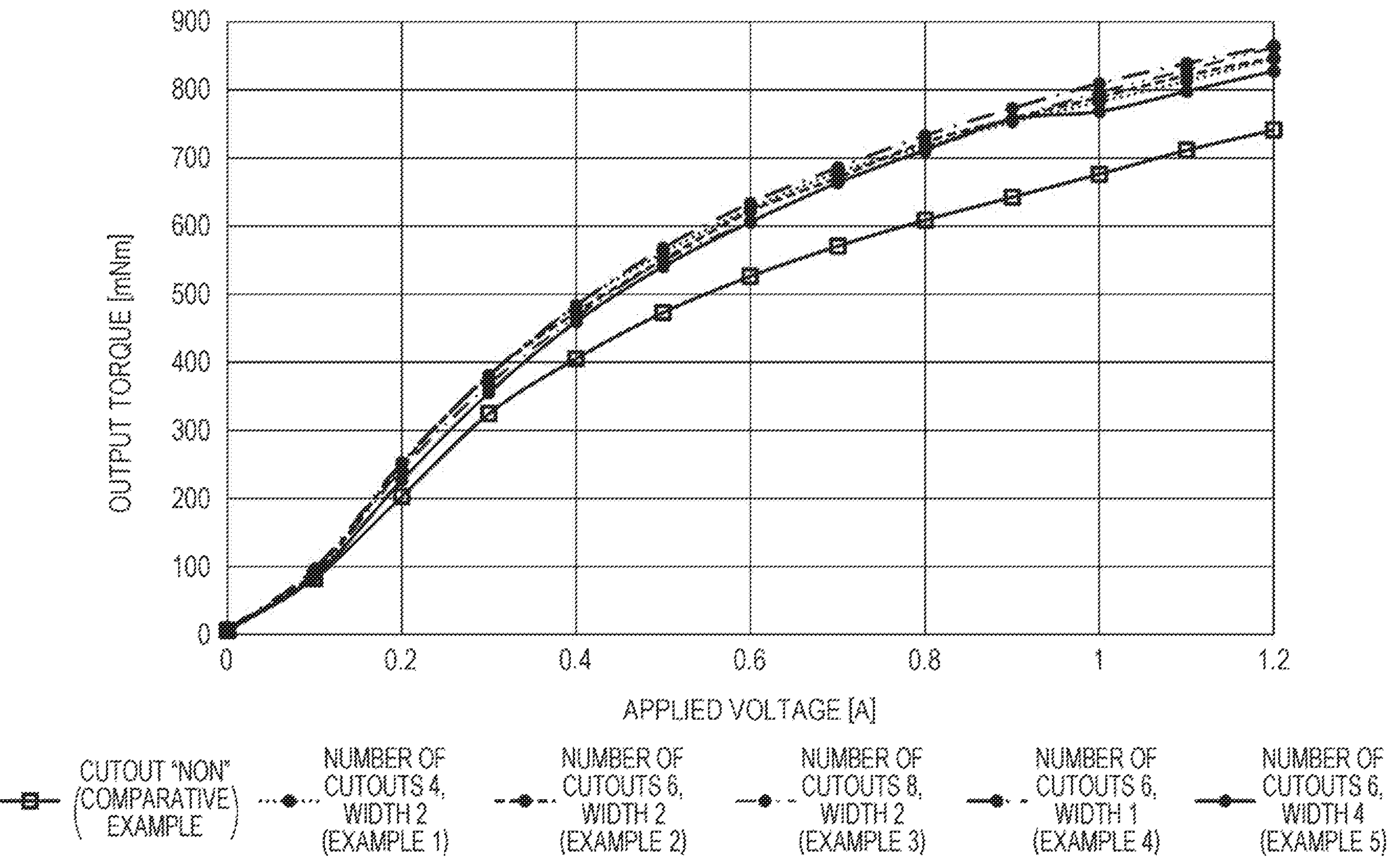
FIG. 9 is a graph showing the relationship between an electric current applied to the coil and the output torque from the torque generation apparatus in the case where magnetic discs in Examples 1 to 5 of the first embodiment and a magnetic disc of a comparative example are used.

FIG. 8A is a plan view of a magnetic disc 170 of a first embodiment illustrating the configuration thereof, FIG. 8B is a perspective view of the magnetic disc 170 in FIG. 8A, FIG. 8C is a cross-sectional view taken along line VIIIC-VIIIC of FIG. 8A, also illustrating the annular portion 31, the second yoke 40, and the annular member 60 in the periphery. FIG. 8D is a cross-sectional view of a modification of the first embodiment illustrating the configuration thereof at a position corresponding to FIG. 8C. FIG. 9 is a graph showing the relationship between the electric current applied to the coil (in amperes) and the output torque (in mNm) from the torque generation apparatus in the case where magnetic discs in Examples 1 to 5 of the first embodiment and a magnetic disc of a comparative example are used. In FIG. 9, the comparative example is represented by a void square, and the individual examples are represented by a filled circle.

As illustrated in FIGS. 8A and 8B, the magnetic disc 170 is a disc-shaped member made of a magnetic material and having circular surfaces (an upper surface 174 and a lower surface 175) disposed so as to cross to the vertical direction (a direction perpendicular to the plane of FIG. 8A) as a whole, like the magnetic disc 120 described above. Furthermore, the magnetic disc 170 has a central hole 171 passing in the vertical direction at the center of the circular surfaces and a plurality of through-holes 172 that vertically pass through the magnetic disc 170 at positions around the central hole 171, like the magnetic disc 120.

The magnetic disc 170 further has six cutout portions 173 provided along the radial direction from the center of the circular surfaces toward the outer circumferential edge 176. These cutout portions 173 are disposed, as a torque increasing portion, at equiangular intervals about the center of the circular surfaces in the outer circumferential area in the second direction, or the radial direction, so as to pass through in the vertical direction (in the thickness direction of the magnetic disc 170). Thus, the cutout portions 173 are long-hole openings that are long in the second direction.

The cutout portions 173 may be formed either at the same time the circular-disc member of the magnetic disc 170 is produced or by laser beam machining, etching, or another means after the circular-disc member is produced. The six cutout portions 173 are formed so that the radial lengths and the circumferential widths of the circular surfaces are each the same. The outer circumferential area is an area including the outside of the magnetic disc in the radial direction (the second direction) and includes an area in which the exciting coil 50 is projected in the direction of the central axis 11.

Although the cutout portions 173 are disposed so as to vertically pass through the magnetic disc 170, the cutout portions 173 may be bottomed recessed portions that do not pass through the magnetic disc 170. The recessed portions in this case may be provided one or both of the upper surface 174 and the lower surface 175 of the magnetic disc 170.

As illustrated in FIG. 8D, the annular portion 31 of the first yoke 30 and the second yoke 40 may respectively have recessed portions 30*a* and 40*a* in the inner circumferential area of the magnetic disc 170, that is, an area in which the cutout portions 173 are not provided. The recessed portions 30*a* and 40*a* are vertically recessed so as to increase the gap between the annular portion 31 and the magnetic disc 170 and the gap between the second yoke 40 and the magnetic disc 170. The recessed portions 30*a* and 40*a* provide the following advantageous effects (1) and (2).

(1) The effect of making it easy for the magnetic flux to flow selectively or concentrically to the outer circumferential area of the magnetic disc 170, making it easy to increase the torque when the intensity of the magnetic field is increased.

(2) The effect of increasing the gap between the annular portion 31 and the magnetic disc 170 and the gap between the second yoke 40 and the magnetic disc 170, thereby decreasing the viscous resistance due to the magnetic viscous fluid.

These recessed portions may be provided in only one of the annular portion 31 and the second yoke 40.

EXAMPLES

The configurations of the cutout portions in Examples 1 to 5 and the comparative example illustrated in FIG. 9 are as follows. The outside diameters (the diameters of the outer circumferential edges) of the circular surfaces of the magnetic discs used in Examples 1 to 5 and the comparative example are the same 45 mm. The cutout portions in Examples 1 to 5 are the same in that the cutout portions extend from the outer circumferential edges to substantially half positions in the radial direction of the magnetic discs, like the cutout portions 173 illustrated in FIGS. 8A to 8C. In Examples 2, 4, and 5, six cutout portions are disposed at equiangular intervals, like the cutout portions 173 illustrated in FIGS. 8A to 8C.

EXAMPLE 1: Four cutout portion that vertically pass through the magnetic disc were provided at equiangular intervals about the center of the circular surfaces of the magnetic disc. The width of each cutout portion (the width in the circumferential direction of the magnetic disc) was set to 2 mm.

EXAMPLE 2: Six cutout portions that vertically pass through the magnetic disc were provided at equiangular intervals about the center of the circular surfaces of the magnetic disc. The width of each cutout portion was set to 2 mm.

EXAMPLE 3: Eight cutout portions that vertically pass through the magnetic disc were provided at equiangular intervals about the center of the circular surfaces of the magnetic disc. The width of each cutout portion was set to 2 mm.

EXAMPLE 4: Six cutout portions that vertically pass through the magnetic disc were provided at equiangular intervals about the center of the circular surfaces of the magnetic disc. The width of each cutout portion was set to 1 mm.

EXAMPLE 5: Six cutout portions that vertically pass through the magnetic disc were provided at equiangular intervals about the center of the circular surfaces of the magnetic disc. The width of each cutout portion was set to 4 mm.

COMPARATIVE EXAMPLE: Cutout portions that vertically pass through the magnetic disc were not provided.

FIG. 9 shows that Examples 1 to 5 exhibited characteristics that can be regarded as similar to each other and provide larger output torque from the same electric current applied than the comparative example. This shows that providing the cutout portions allows for generating a larger resisting force (torque) than the case without the cutout portions (comparative example), improving the braking torque performance. This may be because providing the cutout portions 173 causes irregularities in the shape of the gap between the annular portion 31 and the second yoke 40, so that, for example, (1) a shearing force generated when the magnetic disc 170 is rotated about the central axis 11 becomes non-uniform in the circumferential direction of the magnetic disc 170 and increases as a whole, (2) the length and the density of the cluster of the magnetic particles differ between a portion with the cutout portions 173 and a portion without the cutout portions 173, (3) the direction and the density of the magnetic lines differ between a portion with the cutout portions 173 and a portion without the cutout portions 173, (4) in the case where the cutout portions 173 pass through the magnetic disc 170 in the thickness direction, a cluster of magnetic particles according to the magnetic flux passing through the cutout portions 173 is formed, and the cluster is cut when the magnetic disc 170 is rotated.

Second Embodiment

Figure 10A:
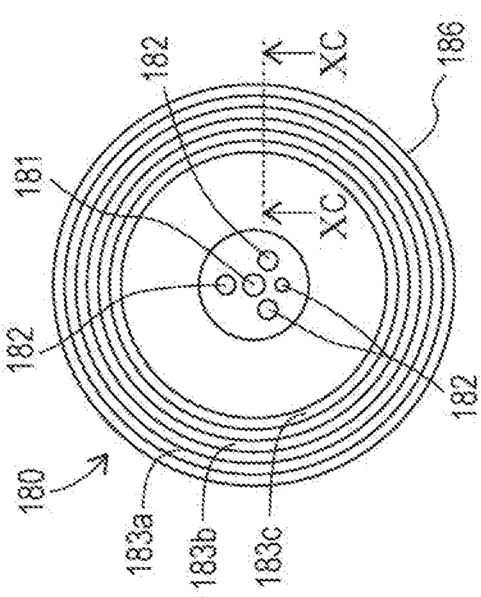
FIG. 10A is a plan view of a magnetic disc of a second embodiment illustrating the configuration thereof.
Figure 10B:
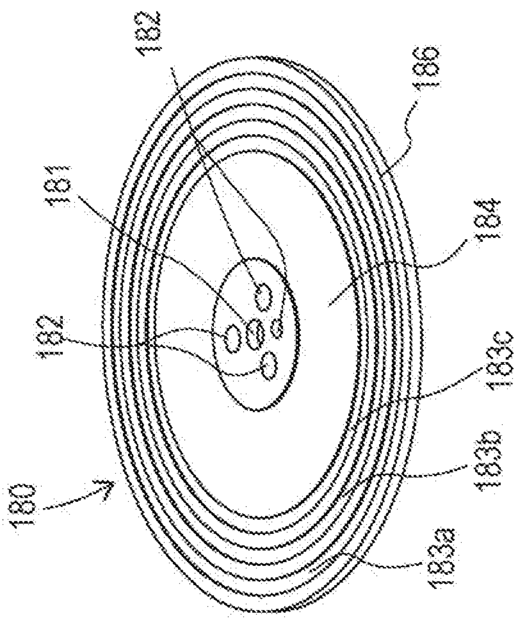
FIG. 10B is a perspective view of the magnetic disc in FIG. 10A.
Figure 10C:
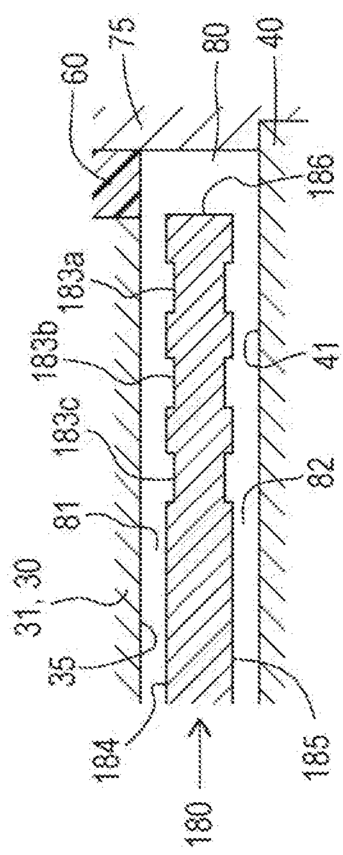
FIG. 10C is a cross-sectional view taken along line XC-XC of FIG. 10A.

FIG. 10A is a plan view of a magnetic disc 180 of a second embodiment illustrating the configuration thereof, FIG. 10B is a perspective view of the magnetic disc 180 in FIG. 10A, and FIG. 10C is a cross-sectional view taken along line XC-XC of FIG. 10A, also illustrating the annular portion 31, the second yoke 40, and the annular member 60 in the periphery.

As illustrated in FIG. 10A and FIG. 10B, the magnetic disc 180 is a disc-shaped member made of a magnetic material and having circular surfaces (an upper surface 184 and a lower surface 185) disposed so as to cross to the vertical direction (a direction perpendicular to the plane of FIG. 10A) as a whole, like the magnetic discs 120 and 170 described above. Furthermore, the magnetic disc 180 has a central hole 181 passing in the vertical direction at the center of the circular surfaces and a plurality of through-holes 182 that vertically pass through the magnetic disc 180 at positions around the central hole 181, like the magnetic discs 120 and 170.

The magnetic disc 180 further has three grooved portions 183*a*, 183*b*, and 183*c* provided concentrically in the circumferential direction of the circular surfaces. These grooved portions 183*a*, 183*b*, and 183*c* are disposed as a torque increasing portion in the outer circumferential area in the second direction, or radial direction, at regular intervals in the second direction. The grooved portions 183*a*, 183*b*, and 183*c* are arranged in order from an outer circumferential edge 186 to the inside in the second direction, each of which is formed in a bottomed groove shape from the upper surface 184 side and the lower surface 185 side. Thus, the torque increasing portion is formed as a plurality of protrusions and depressions in the upper surface 184 and the lower surface 185, as illustrated in FIG. 10C. The grooved portions 183*a*, 183*b*, and 183*c* may be formed either at the same time the circular-disc member of the magnetic disc 180 is produced or by laser beam machining, etching, or another means after the circular-disc member is produced.

Although the grooved portions 183*a*, 183*b*, and 183*c* are recessed inward from both of the upper surface 184 and the lower surface 185 of the magnetic disc 180, the grooved portions 183*a*, 183*b*, and 183*c* may be recessed from only one of the upper surface 184 and the lower surface 185. The number and width of the grooved portions are not limited to the example illustrated in FIGS. 10A, 10B, and 10C.

Disposing recessed portions in each of areas of the annular portion 31 of the first yoke 30 and the second yoke 40 facing the inner circumferential area of the magnetic disc 180, as in the first embodiment, can decrease the resisting force (initial torque) in a state in which no electric current is applied to the exciting coil 50.

It is also preferable to add the cutout portions 173 of the first embodiment. This allows for further providing irregularities in the shape of the gap between the annular portion 31 and the second yoke 40.

The output torque from the torque generation apparatus versus the electric current applied to the coil was measured for the magnetic disc 180 with the configuration of the second embodiment and a magnetic disc without the grooved portions 183*a*, 183*b*, and 183*c*, as in FIG. 9. The measurement showed that the magnetic disc 180 obtained a larger output torque with respect to the same electric current applied. This shows that providing the grooved portions 183*a*, 183*b*, and 183*c* causes a larger resisting force (torque) than that without the grooved portions 183*a*, 183*b*, and 183*c*, improving the braking torque performance. This may be because providing the grooved portions 183*a*, 183*b*, and 183*c* causes irregularities in the shape of the gap between the annular portion 31 and the second yoke 40, so that, for example, (1) a shearing force generated when the magnetic disc 180 is rotated about the central axis 11 becomes non-uniform in the radial direction of the magnetic disc 180 and increases as a whole, (2) the length and the density of the cluster of the magnetic particles differ between a portion with the grooved portions 183*a*, 183*b*, and 183*c* and a portion without the grooved portions 183*a*, 183*b*, and 183*c*, (3) the direction and the density of the magnetic lines differ between a portion with the grooved portions 183*a*, 183*b*, and 183*c* and a portion without the grooved portions 183*a*, 183*b*, and 183*c*.

Third Embodiment

Figure 11B:
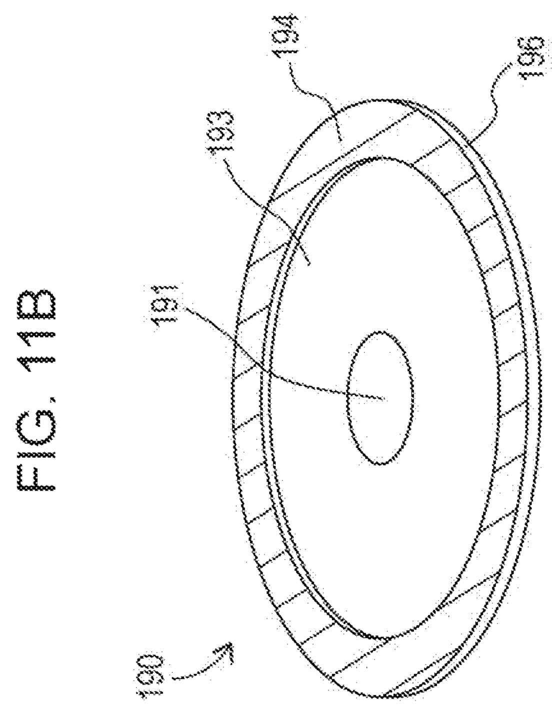
FIG. 11B is a perspective view of the magnetic disc in FIG. 11A.
Figure 11A:
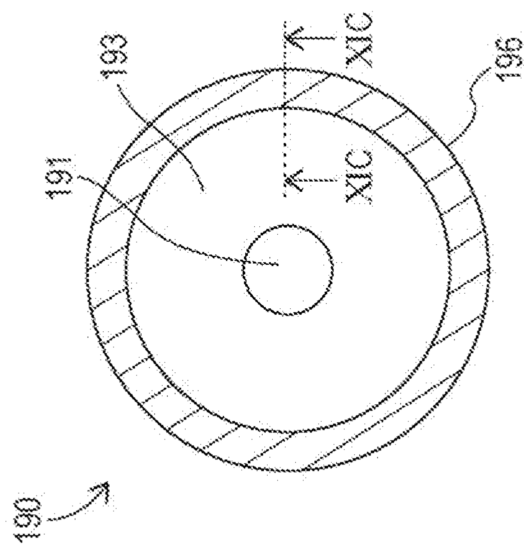
FIG. 11A is a plan view of a magnetic disc of a third embodiment illustrating the configuration thereof.
Figure 11C:
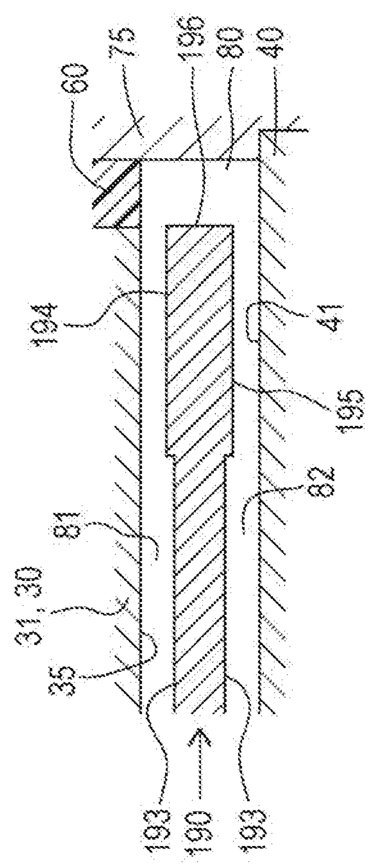
FIG. 11C is a cross-sectional view taken along line XIC-XIC in FIG. 11A.

FIG. 11A is a plan view of a magnetic disc 190 of a third embodiment illustrating the configuration thereof, FIG. 11B is a perspective view of the magnetic disc 190 in FIG. 11A, and FIG. 11C is a cross-sectional view taken along line XIC-XIC in FIG. 11A, also illustrating the annular portion 31, the second yoke 40, and the annular member 60 in the periphery.

As illustrated in FIGS. 11A and 11B, the magnetic disc 190 is a disc-shaped member made of a magnetic material and having circular surfaces (an upper surface 194 and a lower surface 195) disposed so as to cross to the vertical direction (a direction perpendicular to the plane of FIG. 11A) as a whole, like the magnetic discs 120, 170, and 180 described above. Furthermore, the magnetic disc 190 has a central hole 191 passing in the vertical direction at the center of the circular surfaces, like the magnetic discs 120, 170, and 180.

The magnetic disc 190 further includes a recessed portion 193 provided radially inside of the circular surfaces. This recessed portion 193 is recessed in a bottomed shape from the upper surface 194 and the lower surface 195 vertically inward in the inner circumferential area in the second direction, or the radial direction (in the direction from the center toward an outer circumferential edge 196). In FIGS. 11A and 11B, the upper surface 194 in the outer circumferential area without the recessed portion 193 is indicated by hatched lines. Thus, as illustrated in FIG. 11C, the magnetic disc 190 is given irregularities by the outer circumferential area and the inner circumferential area, and the outer area thicker than the recessed portion 193 functions as a torque increasing portion. The recessed portion 193 may be formed either at the same time the circular-disc member of the magnetic disc 190 is produced or by laser beam machining, etching, or another means after the circular-disc member is produced.

Although the recessed portion 193 is recessed inward from both of the upper surface 194 and the lower surface 195 of the magnetic disc 190, the recessed portion 193 may be recessed from only one of the upper surface 194 and the lower surface 195. The size of the grooved portions is not limited to the example illustrated in FIGS. 11A, 11B, and 11C.

Disposing recessed portions in each of areas of the annular portion 31 of the first yoke 30 and the second yoke 40 facing the inner circumferential area of the magnetic disc 190, as in the first embodiment, can decrease the resisting force (initial torque) in a state in which no electric current is applied to the exciting coil 50.

It is also preferable to add the cutout portions 173 of the first embodiment. This allows for further providing irregularities in the shape of the gap between the annular portion 31 and the second yoke 40.

The output torque from the torque generation apparatus versus the electric current applied to the coil was measured for the magnetic disc 190 with the configuration of the third embodiment and a magnetic disc without the recessed portion 193, as in FIG. 9. The measurement showed that the magnetic disc 190 obtained a larger output torque with respect to the same electric current applied. This shows that providing the recessed portion 193 causes a larger resisting force (torque) than that without the recessed portion 193, improving the braking torque performance. This may be because, in addition to the same causes as in the first embodiment, the gap between the first yoke 30 and the second yoke 40 in the inner circumferential area can be increased, which increases the magnetic flux density in the outer circumferential area without the recessed portion 193 and thus the gap is small (an area in which the magnetic field is concentrated (the hatched portion in FIGS. 11A and 11B).

Comparison between the magnetic disc 190 and a magnetic disc without the recessed portion 193 showed that the magnetic disc 190 was thin in the area with the recessed portion 193, and the initial torque can be smaller with the magnetic disc 190.

Fourth Embodiment

Figure 12B:
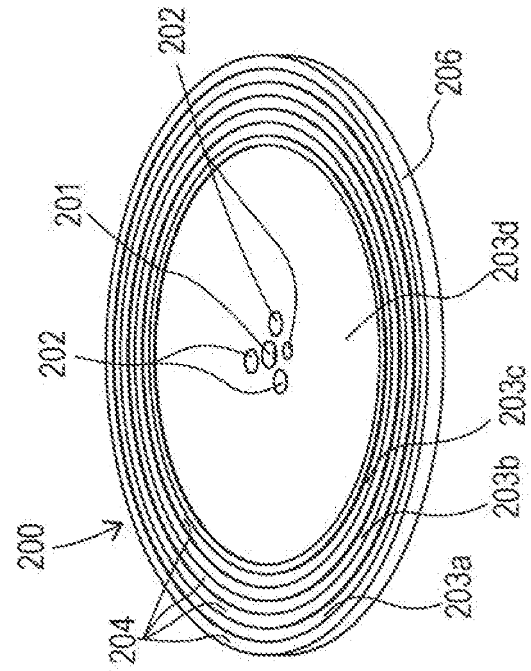
FIG. 12B is a perspective view of the magnetic disc in FIG. 12A.
Figure 12A:
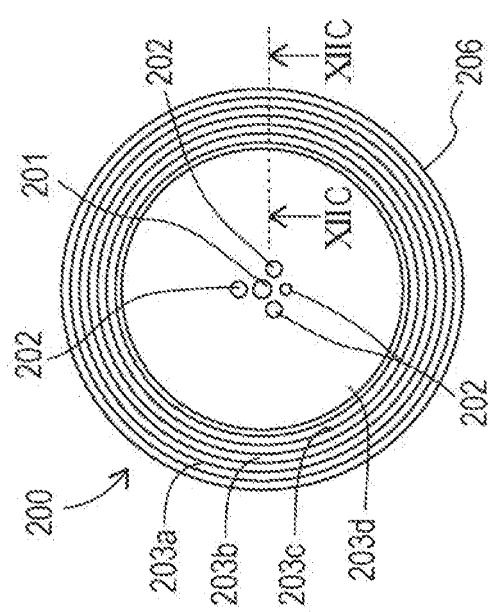
FIG. 12A is a plan view of a magnetic disc of a fourth embodiment illustrating the configuration thereof.
Figure 12C:
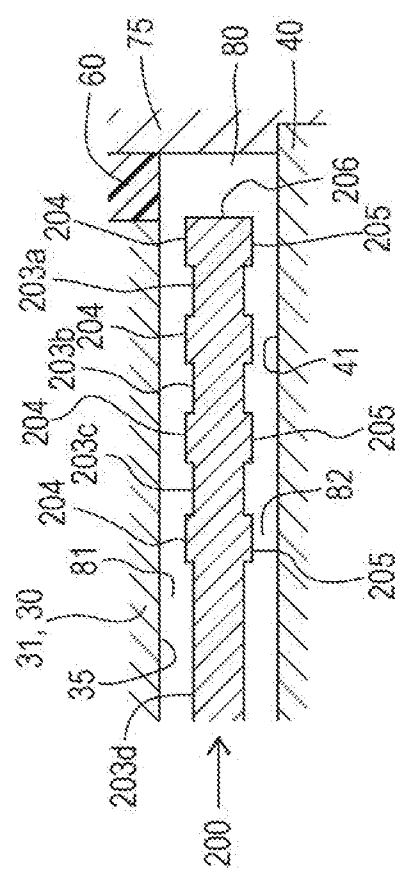
FIG. 12C is a cross-sectional view taken along line XIIC-XIIC in FIG. 12A.

FIG. 12A is a plan view of a magnetic disc 200 of a fourth embodiment illustrating the configuration thereof, FIG. 12B is a perspective view of the magnetic disc 200 in FIG. 12A, and FIG. 12C is a cross-sectional view taken along line XIIC-XIIC in FIG. 12A, also illustrating the annular portion 31, the second yoke 40, and the annular member 60.

The magnetic disc 200 of the fourth embodiment includes a recessed portion 203*d* in the inner circumferential area in the radial direction (the second direction), like the recessed portion 193 of the third embodiment, and includes, as a torque increasing portion, three bottomed grooved portions 203*a*, 203*b*, and 203*c* in the outer circumferential area in the radial direction (the second direction) at regular intervals, like the grooved portions 183*a*, 183*b*, and 183*c* of the second embodiment.

The magnetic disc 200 is a disc-shaped member made of a magnetic material and having circular surfaces (an upper surface 204 and a lower surface 205) disposed so as to cross to the vertical direction (a direction perpendicular to the plane of FIG. 12A) as a whole, like the magnetic discs 120, 170, and 180 described above. Furthermore, the magnetic disc 200 has a central hole 201 passing in the vertical direction at the center of the circular surfaces and a plurality of through-holes 202 that vertically pass through the magnetic disc 200 at positions around the central hole 201.

With this configuration, providing the grooved portions 203*a* to 203*c* allows for generating a resisting force (torque) larger than that without the grooved portions 203*a* to 203*c*, improving the braking torque performance. Further providing the recessed portion 203*d* allows for decreasing the initial torque. In other words, the above configuration provides an efficient torque generation apparatus that, when no electric current is applied, generates small torque, and when an electric current is applied, has a high responsivity to the electric current applied.

Having described the present invention with reference to the above embodiments, it is to be understood that the present invention is not limited to the above embodiments, and modifications or changes can be made within the object of the modifications or the spirit of the present invention. For example, in the above embodiments, the outside diameter of the disc is 45 mm. This is given for mere illustrative purposes, and the outside diameter of the disc of the torque apparatus may be in meters. Even if the disc outside diameter is large, the torque generation apparatus can be relatively reduced in size, and the braking torque of the torque generation apparatus of the present invention per volume can be increased.

The torque generation apparatus according to the present invention is useful in that it is suitable for size reduction and can provide a large shearing force.

What is claimed is:

1. A torque generation apparatus comprising:

a magnetic disc configured to rotate about a rotation axis;

a first yoke and a second yoke disposed opposite sides of the magnetic disc in a first direction parallel to the rotation axis;

an annular member fixed to a periphery of the first yoke;

a magnetic viscous fluid placed between the magnetic disc and the first yoke and between the magnetic disc and the second yoke;

a coil disposed so as to overlap with the magnetic disc when viewed along the first direction; and a third yoke having a side wall, the side wall having an area adjacent to the magnetic disc at least outside the magnetic disc and the coil, the third yoke constituting a magnetic path of a magnetic field generated by the coil together with the first yoke and the second yoke, wherein the magnetic disc includes a torque increasing portion at at least one of a surface facing the first yoke and a surface facing the second yoke, the torque increasing portion is disposed in an outer circumferential area of the magnetic disc in a second direction that is a radial direction perpendicular to the first direction, the torque increasing portion is configured to increase a shearing force for a cluster of the magnetic viscous fluid as compared with an inner circumferential area of the magnetic disc inside the outer circumferential area, the third yoke has a magnetic gap between the third yoke and the first yoke, the magnetic gap is disposed outside an outer circumferential edge of the magnetic disc or at a position overlapping with the outer circumferential edge of the magnetic disc as viewed along the first direction, a periphery of the second yoke is in contact with the side wall of the third yoke, and the second yoke is magnetically connected to the third yoke, and the first yoke is fixed to an upper wall of the third yoke in the first direction, and a periphery of the annular member is in contact with an inner surface of the side wall of the third yoke, wherein the magnetic a extends from a bottom surface of the coil to an upper surface of the second yoke along the first direction, the annular member is made of a non-magnetic material, and the annular member is circular-shaped and has a first outside diameter, the coil is disposed on a step in the first yoke, and the coil has a second outside diameter that is substantially the same as the first outside diameter of the annular member, and a lower surface of the annular member is substantially flush with a bottom surface of the first yoke.

2. The torque generation apparatus according to claim 1, wherein the first yoke includes an annular portion and a cylindrical portion that are integrally formed, the annular portion is located between the coil and the magnetic disc, and the annular portion overlaps with the coil and the magnetic disc as viewed along the first direction, the cylindrical portion extends upward along the first direction from an upper surface of the annular portion, and the cylindrical portion is provided concentrically with the annular portion, an outside diameter of the cylindrical portion is smaller than an outside diameter of the annular portion, and an inner circumference of the coil conforms to an outer circumference of the cylindrical portion.

3. The torque generation apparatus according to claim 1, wherein the torque increasing portion includes an opening passing through the magnetic disc in the first direction, and the opening is a long hole, and a length along the second direction of the long hole is larger than a width of the long hole as viewed along the first direction.

4. The torque generation apparatus according to claim 1, wherein the torque increasing portion is formed as protrusions and depressions of the magnetic disc in the first direction, and the protrusions and depressions are provided concentrically about the rotation axis.

5. The torque generation apparatus according to claim 1, wherein a first gap between the first yoke and the second yoke in the torque increasing portion of the magnetic disc is smaller than a second gap between the first yoke and the second yoke in the inner circumferential area of the magnetic disc.

6. The torque generation apparatus according to claim 1, wherein a distance between the outer circumferential edge of the magnetic disc and an outer side of the third yoke is not constant in a plane perpendicular to the rotation axis.

7. The torque generation apparatus according to claim 6, wherein the third yoke is substantially quadrangular in a plan view.

* * * * *